(12) United States Patent
Lu et al.

(10) Patent No.: US 11,449,678 B2
(45) Date of Patent: Sep. 20, 2022

(54) DEEP LEARNING BASED DIALOG METHOD, APPARATUS, AND DEVICE

(71) Applicant: HUAWEI TECHNOLOGIES CO., LTD., Guangdong (CN)

(72) Inventors: Zhengdong Lu, Hong Kong (CN); Shan He, Shenzhen (CN); Qiang Jiang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 377 days.

(21) Appl. No.: 16/369,579

(22) Filed: Mar. 29, 2019

(65) Prior Publication Data

US 2019/0228070 A1  Jul. 25, 2019

Related U.S. Application Data

(63) Continuation of application No. PCT/CN2017/086609, filed on May 31, 2017.

(30) Foreign Application Priority Data

Sep. 30, 2016 (CN) .......................... 201610876941.0

(51) Int. Cl.
*G06F 40/30* (2020.01)
*G06F 16/00* (2019.01)
(Continued)

(52) U.S. Cl.
CPC .............. *G06F 40/30* (2020.01); *G06F 16/00* (2019.01); *G06F 16/2455* (2019.01);
(Continued)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS

| 5,357,596 A | 10/1994 | Takebayashi et al. |
| 8,452,476 B2 | 5/2013 | Kuenzner |

(Continued)

FOREIGN PATENT DOCUMENTS

| CN | 101010934 A | 8/2007 |
| CN | 100371926 C | 2/2008 |

(Continued)

OTHER PUBLICATIONS

Yao et al., Yao, Attention with Intention for a Neural Network Conversation Model, 2015, journal={arXiv preprint arXiv: 1510. 08565}, pp. 1-7. (Year: 2015).*

(Continued)

*Primary Examiner* — Lamont M Spooner
(74) *Attorney, Agent, or Firm* — Womble Bond Dickinson (US) LLP

(57) ABSTRACT

A deep learning based dialog method, apparatus, and device are provided and belong to the field of artificial intelligence. The method includes: obtaining a to-be-replied statement, encoding the to-be-replied statement to obtain a first vector, where the first vector is a representation of the to-be-replied statement; obtaining dialog history information corresponding to the to-be-replied statement, and the attention vector is used to represent search intent; making each dialog statement interact with the attention vector, so as to extract information related to the search intent from the dialog statement to obtain a plurality of result vectors, generating a to-be-decoded vector based on the plurality of result vectors, and decoding the to-be-decoded vector to obtain a next word in the reply statement. In the method, the reply statement refers to a dialog history.

15 Claims, 12 Drawing Sheets

(51) Int. Cl.
  *G06N 99/00* (2019.01)
  *G06F 40/35* (2020.01)
  *G06F 40/56* (2020.01)
  *G06F 40/216* (2020.01)
  *G06F 16/2455* (2019.01)
  *G06N 3/08* (2006.01)

(52) U.S. Cl.
  CPC ............ *G06F 40/216* (2020.01); *G06F 40/35* (2020.01); *G06F 40/56* (2020.01); *G06N 3/08* (2013.01); *G06N 99/00* (2013.01)

(56) References Cited

U.S. PATENT DOCUMENTS

| | | | |
|---|---|---|---|
| 8,731,772 B2 | 5/2014 | Kuenzner | |
| 8,812,323 B2 | 8/2014 | Tong et al. | |
| 9,715,496 B1* | 7/2017 | Sapoznik | G06F 16/90332 |
| 10,810,509 B2* | 10/2020 | Miyazaki | G06F 40/253 |
| 11,010,550 B2* | 5/2021 | Bellegarda | G06N 3/0445 |
| 2004/0254998 A1* | 12/2004 | Horvitz | G06Q 10/107 709/206 |
| 2005/0267753 A1 | 12/2005 | Yang | |
| 2006/0020473 A1 | 1/2006 | Hiroe et al. | |
| 2007/0118380 A1 | 5/2007 | Konig | |
| 2008/0096533 A1* | 4/2008 | Manfredi | G06N 3/006 455/412.1 |
| 2009/0216691 A1* | 8/2009 | Borzestowski | G06F 16/3332 715/706 |
| 2009/0228264 A1 | 9/2009 | Williams et al. | |
| 2011/0010367 A1* | 1/2011 | Jockish | G06Q 10/10 715/764 |
| 2014/0279050 A1 | 9/2014 | Makar et al. | |
| 2014/0297268 A1* | 10/2014 | Govrin | G06N 5/04 704/9 |
| 2015/0066479 A1* | 3/2015 | Pasupalak | G06F 16/90332 704/9 |
| 2015/0142704 A1* | 5/2015 | London | G06Q 10/10 706/11 |
| 2015/0154492 A1* | 6/2015 | Ponomarev | H04W 4/70 706/11 |
| 2015/0178392 A1* | 6/2015 | Jockisch | G06F 16/9535 707/706 |
| 2016/0132773 A1* | 5/2016 | Chandrasekaran | G06F 16/9032 706/11 |
| 2016/0352656 A1* | 12/2016 | Galley | H04L 51/02 |
| 2017/0024645 A1* | 1/2017 | Socher | G06N 3/08 |
| 2017/0091780 A1* | 3/2017 | Kannan | G06F 16/3331 |
| 2017/0124064 A1 | 5/2017 | Lu et al. | |
| 2017/0192956 A1* | 7/2017 | Kaiser | G10L 25/30 |
| 2017/0330077 A1* | 11/2017 | Williams | G06F 40/295 |
| 2018/0060301 A1* | 3/2018 | Li | G06F 40/289 |
| 2018/0089584 A1* | 3/2018 | Bakis | G06N 5/04 |
| 2018/0091457 A1* | 3/2018 | Bakis | G06N 20/00 |
| 2018/0276525 A1* | 9/2018 | Jiang | G06F 40/216 |

FOREIGN PATENT DOCUMENTS

| | | |
|---|---|---|
| CN | 104217226 A | 12/2014 |
| CN | 105095182 A | 11/2015 |
| CN | 105159996 A | 12/2015 |
| CN | 105511608 A | 4/2016 |
| CN | 105787560 A | 7/2016 |
| CN | 105975531 A | 9/2016 |
| WO | 2002/103673 A1 | 12/2002 |

OTHER PUBLICATIONS

Wen et al. (A Network-based End-to-End Trainable Task-oriented Dialogue System), journal ={arXiv preprint arXiv: 1604.04562}, year={2016}, pp. 1-12 (Year: 2016).*

Yin et al. (Yin, Neural Generative Question Answering), journal = {arXiv preprint arXiv: 1512.01337}, year={2015}, pp. 1-12 (Year: 2015).*

Yu Kai et al. Cognitive Technology in Task-Oriented Dialogue Systems:Concepts,Advances and Future, Chinese Journal of Computers, Dec. 2015. with English abstract. Total 16 pages.

Oriol Vinyals et al. A Neural Conversational Model, Proceedings of the 31 st International Conference on Machine, Learning, Lille, France, 2015. total 8 pages.

Lifeng Shang et al. Neural Responding Machine for Short-Text Conversation, Mar. 9, 2015. total 12 pages.

* cited by examiner

DEEP LEARNING BASED DIALOG METHOD, APPARATUS, AND DEVICE

CROSS-REFERENCE TO RELATED APPLICATIONS

This application is a continuation of International Application No. PCT/CN2017/086609, filed on May 31, 2017, which claims priority to Chinese Patent Application No. 201610876941.0, filed on Sep. 30, 2016. The disclosures of the aforementioned applications are hereby incorporated by reference in their entireties.

TECHNICAL FIELD

This application relates to the field of artificial intelligence, and in particular, to a deep learning based dialog method, apparatus, and device.

BACKGROUND

Natural language dialog is one of the most challenging issues in artificial intelligence. There are many practical dialog systems such as Apple Siri. These dialog systems can conduct simple dialog with people and perform some simple tasks such as weather inquiry and stocks query.

A deep learning based dialog system is a development direction of a current dialog system. After a to-be-replied statement entered by a user is obtained, a method for generating a reply statement by the deep learning based dialog system includes: encoding the to-be-replied statement into a vector; and decoding the vector to obtain a reply statement.

In a process of generating the reply statement, this type of dialog system cannot effectively process and utilize dialog history information. Consequently, the reply statement output by the dialog system may not meet a user requirement and dialog quality is not high.

SUMMARY

To resolve a prior-art problem that a reply statement output by a dialog system may not meet a user requirement because dialog history information cannot be effectively processed and utilized, embodiments of the present application provide a deep learning based dialog method, apparatus, and device. The technical solutions are as follows:

According to a first aspect, an embodiment of the present application provides a deep learning based dialog method, where the method includes: obtaining a to-be-replied statement; encoding the to-be-replied statement to obtain a first vector, where the first vector is a representation of the to-be-replied statement; obtaining dialog history information corresponding to the to-be-replied statement, where the dialog history information includes at least one round of dialog statements, and each round of dialog statements includes two dialog statements; composing an attention vector by using the first vector and a decoding status vector, where the decoding status vector is used to indicate a status of a decoder when a current word in a reply statement is output, and the attention vector is used to represent search intent; making each dialog statement interact with the attention vector, so as to extract information related to the search intent from the dialog statement to obtain a plurality of result vectors; generating a to-be-decoded vector based on the plurality of result vectors; and decoding the to-be-decoded vector to obtain a next word in the reply statement.

In this embodiment of the present application, after the to-be-replied statement is encoded into the first vector, the attention vector representing the search intent is composed by using the first vector and the decoding status vector, information in the dialog history information is extracted by using the attention vector, then the to-be-decoded vector is generated, and the to-be-decoded vector is decoded to generate the word in the reply statement. According to this dialog manner, the generated reply statement is not only generated based on the to-be-replied statement, but also refers to content in the dialog history information corresponding to the to-be-replied statement, and the dialog history information can be effectively processed and utilized. In this way, the output reply statement can meet a user requirement and dialog quality is improved.

In one embodiment, the composing an attention vector by using the first vector and a decoding status vector includes: using each dimension of both the first vector and the decoding status vector as input to a neural network used for vector composition, to make the first vector interact with the decoding status vector to generate the attention vector, where both the first vector and the decoding status vector include a plurality of dimensions.

The reply statement is generated in a word-by-word manner. Therefore, in this embodiment, a status of the decoder is represented by the vector, and the attention vector is composed by using the vector and the first vector, so that the attention vector can be used to extract the information, in the dialog history information, related to a feature concerned in a decoding process. This improves accuracy of the generated word.

In one embodiment, the making each dialog statement interact with the attention vector, so as to extract information related to the search intent from the dialog statement to obtain a plurality of result vectors includes: encoding each dialog statement in the dialog history information to obtain a second vector corresponding to the dialog statement, where the second vector is a representation of the corresponding dialog statement; and making each second vector interact with the attention vector, so as to extract the information related to the search intent from the dialog statement to obtain the plurality of result vectors.

In one embodiment, the second vectors obtained by encoding the dialog history information are made to interact with the attention vector, so as to extract feature information, in the dialog history information, related to the to-be-replied statement, to obtain the result vectors. In this way, the feature information, in the dialog history information, related to the to-be-replied statement is extracted, so that in a process of generating the to-be-replied statement, reference is made to the content of the dialog history information, so as to improve accuracy of the reply statement.

In one embodiment, the making each dialog statement interact with the attention vector, so as to extract information related to the search intent from the dialog statement to obtain a plurality of result vectors includes: encoding each dialog statement in the dialog history information, and entering the attention vector together with the dialog statement into an encoder during an encoding process, so as to extract the information related to the search intent from the dialog statement to obtain the plurality of result vectors.

In one embodiment, the attention vector is directly added during encoding of the dialog statement, and the information in the dialog statement is extracted by using the attention vector. In this way, the feature information, in the dialog history information, related to the to-be-replied statement is extracted, so that in a process of generating the to-be-replied statement, reference is made to the content of the dialog history information, so as to improve accuracy of the reply statement.

In one embodiment, the generating a to-be-decoded vector based on the plurality of result vectors includes:

separately using the plurality of result vectors as input to a neural network used for feature extraction, so as to extract features of the plurality of result vectors to generate the to-be-decoded vector.

In one embodiment, information in the dialog statement is further compressed, to generate the to-be-decoded vector for decoding.

According to a second aspect, a depth learning based dialog apparatus is provided, where the apparatus includes several units, such as a first obtaining unit, an encoding unit, a second obtaining unit, a composing unit, an extraction unit, a generation unit, and a decoding unit, and the several units are configured to implement the method provided in any one of the first aspect or embodiments of the first aspect.

According to a third aspect, a deep learning based dialog device is provided, where the deep learning based dialog device includes a processor, a memory, and a communications interface, the memory is configured to store a software program and a module, and the processor implements, by running or executing the software program and/or the module stored in the memory, the method provided in any one of the first aspect or the embodiments of the first aspect.

According to a fourth aspect, a computer-readable storage medium is provided, where the computer-readable storage medium is configured to store program code to be executed by the foregoing processor in service transmission. The program code includes an instruction used to implement the method provided in any one of the first aspect or the embodiments of the first aspect.

Technical effects obtained in the second to the fourth aspects of the embodiments of the present application are similar to technical effects obtained by using corresponding technical means in the first aspect. Details are not repeated herein.

DESCRIPTION OF EMBODIMENTS

To make the objectives, technical solutions, and advantages of this application clearer, the following further describes embodiments of this application in detail with reference to the accompanying drawings.

Figure 1:
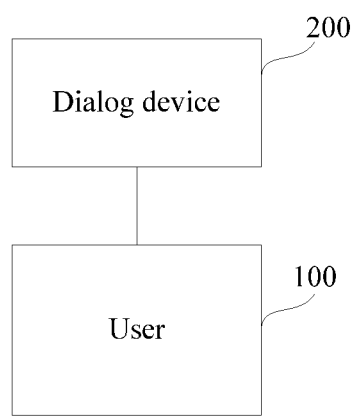
FIG. 1 is a diagram of an application scenario according to an embodiment of the present application.

For ease of understanding of the technical solutions provided in the embodiments of the present application, an application scenario of this application is described first with reference to FIG. 1.

The scenario includes a user 100 and a deep learning based dialog device 200 (referred to as a dialog device below). The dialog device 200 is configured to perform the following dialog process: obtaining a to-be-replied statement of the user 100, replying the to-be-replied statement to generate a reply statement, and presenting the reply statement to the user 100.

In one embodiment, the user 100 may be a person, the dialog device 200 may be a terminal device such as a mobile phone or a computer, and the dialog process is implemented between the person and the terminal device. For example, as a dialog device, the mobile phone can have embedded software that can be used to perform man-machine dialog. The person asks the software a question (a to-be-replied statement) through a text or voice input, and the software generates an answer (a reply statement) based on the question of the person and displays the answer. The software may be software that has functions of questioning and answering, automatic information reply, machine translation, and the like.

In another embodiment, the user 100 may be a client, the dialog device 200 is a server, and the dialog process is implemented between the client and the server. The client includes, but is not limited to, a mobile phone, a computer, and the like. The server may be a server capable of providing various services. The services include, but are not limited to weather inquiry, business consultation, an intelligent customer service (for a ticket service, a restaurant service, or the like), and the like.

Figure 2:
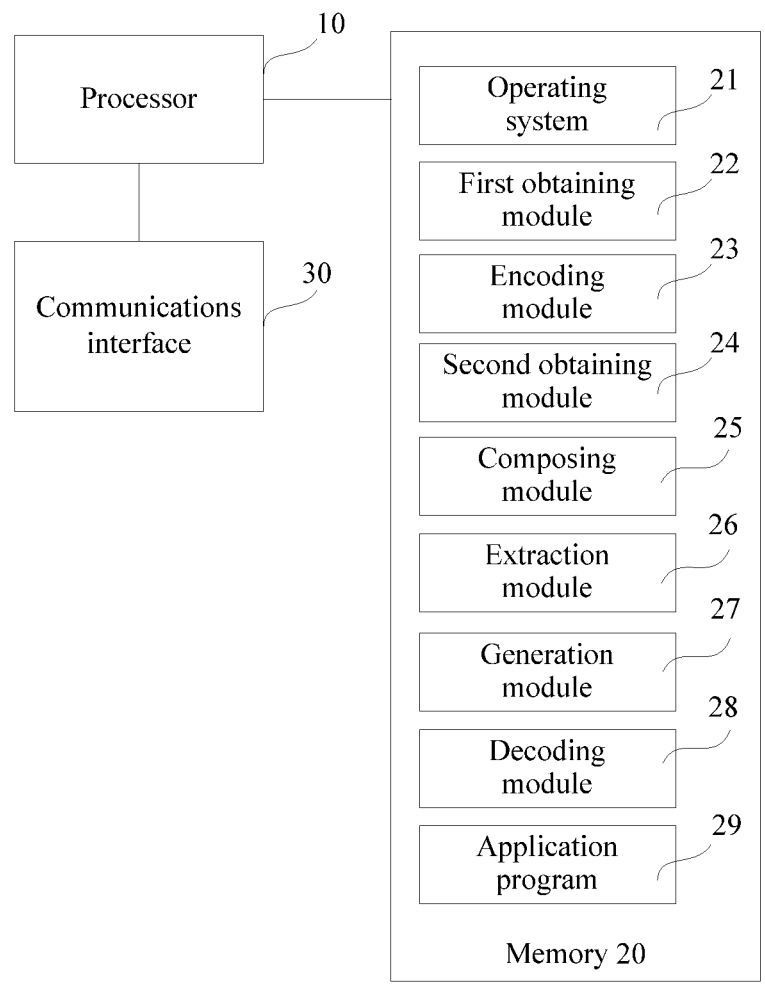
FIG. 2 is a block diagram of a deep learning based dialog device according to an embodiment of the present application.

FIG. 2 is a schematic diagram of a possible hardware structure of a deep learning based dialog device. As shown in FIG. 2, the dialog device includes a processor 10, a memory 20, and a communications interface 30. A person skilled in the art may understand that, the structure shown in FIG. 2 does not constitute any limitation to the dialog device, and may include more or fewer parts than those shown in the figure, a combination of some parts, or parts disposed differently.

The processor 10 is a control center of the dialog device, is connected to all parts of the entire dialog device by using various interfaces and lines, and executes, by running or executing a software program and/or a module that are/is stored in the memory 20 and by invoking data stored in the memory 20, various functions of the dialog device and data processing, so as to perform overall control on the dialog device. The processor 10 may be implemented by a CPU or a graphics processing unit (English: Graphics Processing Unit, GPU for short).

The memory 20 may be configured to store the software program and the module. The processor 10 executes various function applications and data processing by running the software program and the module that are stored in the memory 20. The memory 20 may mainly include a program storage area and a data storage area. The program storage area may store an operating system 21, a first obtaining module 22, an encoding module 23, a second obtaining module 24, a composing module 25, an extraction module 26, and a generation module 27, a decoding module 28, an application 29 required for at least one function (such as neural network training), and the like. The data storage area may store data (such as dialog history information) created based on use of the dialog device. The memory 20 may be implemented by any type of volatile or non-volatile storage device or by a combination thereof, for example, a static random access memory (English: Static Random Access Memory, SRAM for short), an electrically erasable programmable read-only memory (English: Electrically Erasable Programmable Read-Only Memory, EEPROM for short), an erasable programmable read-only memory (English: Erasable Programmable Read Only Memory, EPROM for short), a programmable read-only memory (English: Programmable Red-Only Memory, PROM for short), a read-only memory (English: Read Only Memory, ROM for short), a magnetic memory, a flash memory, a magnetic disk, or an optical disc. Accordingly, the memory 20 may further include a memory controller to support accessing the memory 20 by the processor 10.

The processor 10 performs the following function by running the first obtaining module 22: obtaining a to-be-replied statement. The processor 20 performs the following function by running the encoding module 23: encoding the to-be-replied statement to obtain a first vector, where the first vector is a representation of the to-be-replied statement. The processor 20 performs the following function by running the second obtaining module 24: obtaining dialog history information corresponding to the to-be-replied statement, where the dialog history information includes at least one round of dialog statements, and each round of dialog statements includes two dialog statements. The processor 20 performs the following function by running the composing module 25: composing an attention vector by using the first vector and a decoding status vector, where the decoding status vector is used to indicate a status of a decoder when a current word in a reply statement is output, and the attention vector is used to represent search intent. The processor 20 performs the following function by running the extraction module 26: making each dialog statement interact with the attention vector, so as to extract information related to the search intent from the dialog statement to obtain a plurality of result vectors. The processor 20 performs the following function by running the generation module 27: generating a to-be-decoded vector based on the plurality of result vectors. The processor 20 performs the following function by running the decoding module 28: decoding the to-be-decoded vector to obtain a next word in the reply statement.

Figure 3:
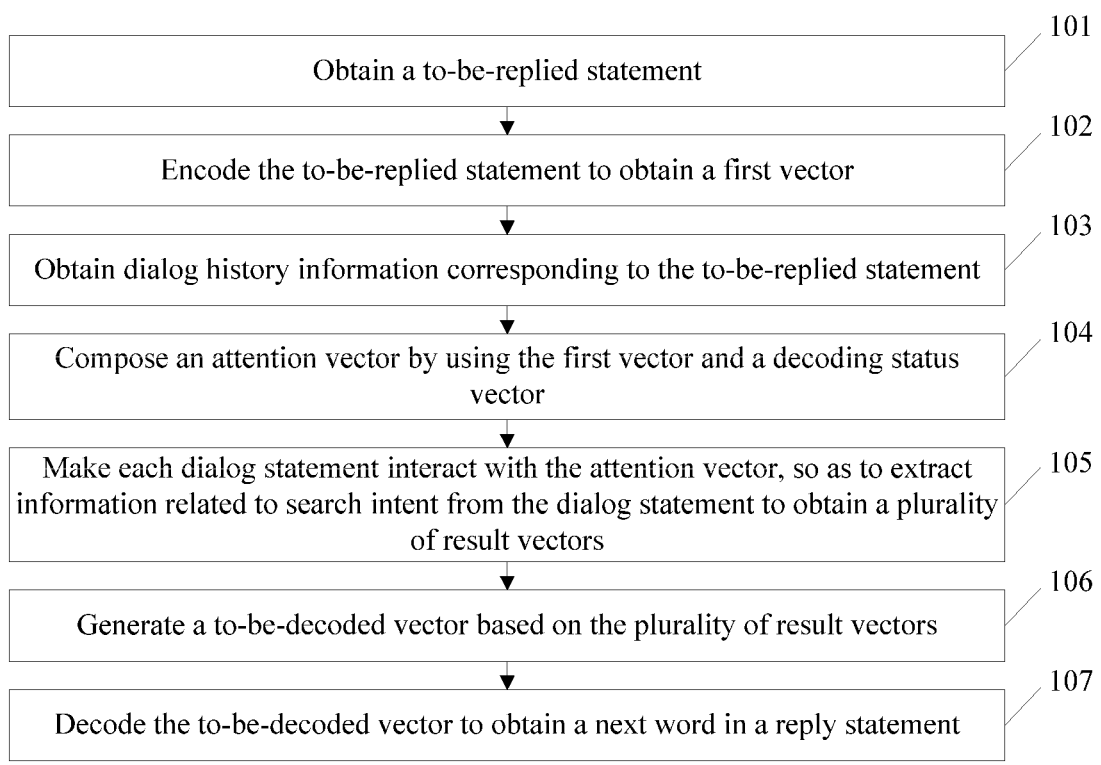
FIG. 3 is a flowchart of a deep learning based dialog method according to an embodiment of the present application.

FIG. 3 is a flowchart of a deep learning based dialog method according to an embodiment of the present application. The method may be implemented by using the dialog device in the foregoing application scenario. Referring to FIG. 3, the method includes the following operations.

Operation 101: Obtain a to-be-replied statement.

The to-be-replied statement is obtained through user input, and the user input includes, but is not limited to, data such as a text, a voice, and a picture.

The obtaining a to-be-replied statement may include: receiving text data (a character, a word, or a sentence), and using the text data as the to-be-replied statement; receiving voice data, performing voice recognition on the voice data to obtain voice-recognized text data, and using the voice-recognized text data as the to-be-replied statement; or receiving picture data, performing optical character recognition on the picture data to obtain recognized text data, and using the recognized text data as the to-be-replied statement.

Operation 102: Encode the to-be-replied statement to obtain a first vector, where the first vector is a representation of the to-be-replied statement.

The first vector may be a single vector.

Operation 102 may include encoding the to-be-replied statement into a single vector. Certainly, a representation form of the encoded to-be-replied statement is not limited thereto in this embodiment of the present application. For example, the representation form may alternatively be a vector sequence. In one embodiment, the to-be-replied statement may be encoded into a vector sequence, and the vector sequence includes at least one vector. When the to-be-replied statement is encoded into a vector sequence, word segmentation processing may be performed first on the to-be-replied statement to obtain at least one word. Then, each word obtained through word segmentation processing is encoded into a vector to constitute the vector sequence.

In this embodiment, the to-be-replied statement is encoded into a single vector, and subsequent processing on the to-be-replied statement becomes processing on the vector. Compared with processing on a vector sequence, this can significantly reduce complexity of subsequent processing. In addition, semantic integrity can be improved by using one vector to represent the to-be-replied statement.

In operation 102, when a vector is used to represent the to-be-replied statement, to be able to express a meaning of the to-be-replied statement, a vector with a relatively large quantity of dimensions is required, for example, 5000 dimensions. When a vector sequence is used to represent the to-be-replied statement, each vector in the vector sequence is used to represent only one word, and therefore each vector may be a vector with a small quantity of dimensions.

In one embodiment, an encoder may be used to encode the to-be-replied statement into a vector, and the encoder is a neural network capable of maximally reproducing an input signal. The vector obtained by the encoder through encoding includes information about various aspects of the to-be-replied statement, for example, intent (which is confirmation, inquiry, or the like) and a specific named entity (such as a place and time).

Operation 103: Obtain dialog history information corresponding to the to-be-replied statement, where the dialog history information includes at least one round of dialog statements, and each round of dialog statements includes two dialog statements.

In one embodiment, the dialog history information corresponding to the to-be-replied statement is a dialog statement generated within specified time between a dialog system and an object that generates the to-be-replied statement. The dialog history information in this application is not limited thereto. The dialog history information may be a specified quantity of dialog statements, or a dialog statement generated during a connection established between a user to a dialog system.

Operation 104: Compose an attention vector by using the first vector and a decoding status vector, where the decoding status vector is used to indicate a status of a decoder when a current word in a reply statement is output, and the attention vector is used to represent search intent.

For example, the attention vector can be used to search for information such as time and a place in the dialog history information.

Operation 105: Make each dialog statement interact with the attention vector, so as to extract information related to the search intent from the dialog statement to obtain a plurality of result vectors.

An artificial neural network may be used to implement interaction between the attention vector and the dialog statement in the dialog history information. For details, refer to description below.

Operation 106: Generate a to-be-decoded vector based on the plurality of result vectors.

In one embodiment, in operation 106, content of the plurality of vectors is compressed into the to-be-decoded vector.

Operation 107: Decode the to-be-decoded vector to obtain a next word in the reply statement.

In this application, the reply statement is generated word by word. This can improve accuracy of the reply statement.

In this embodiment of the present application, after the to-be-replied statement is encoded into the first vector, the attention vector representing the search intent is composed by using the first vector and the decoding status vector, the information in the dialog history information is extracted by using the attention vector, then the to-be-decoded vector is generated, and the to-be-decoded vector is decoded to generate the word in the reply statement. According to this dialog manner, the generated reply statement is not only generated based on the to-be-replied statement, but also refers to content in the dialog history information corresponding to the to-be-replied statement, and the dialog history information can be effectively processed and utilized. In this way, the output reply statement can meet a user requirement and dialog quality is improved.

Figure 4:
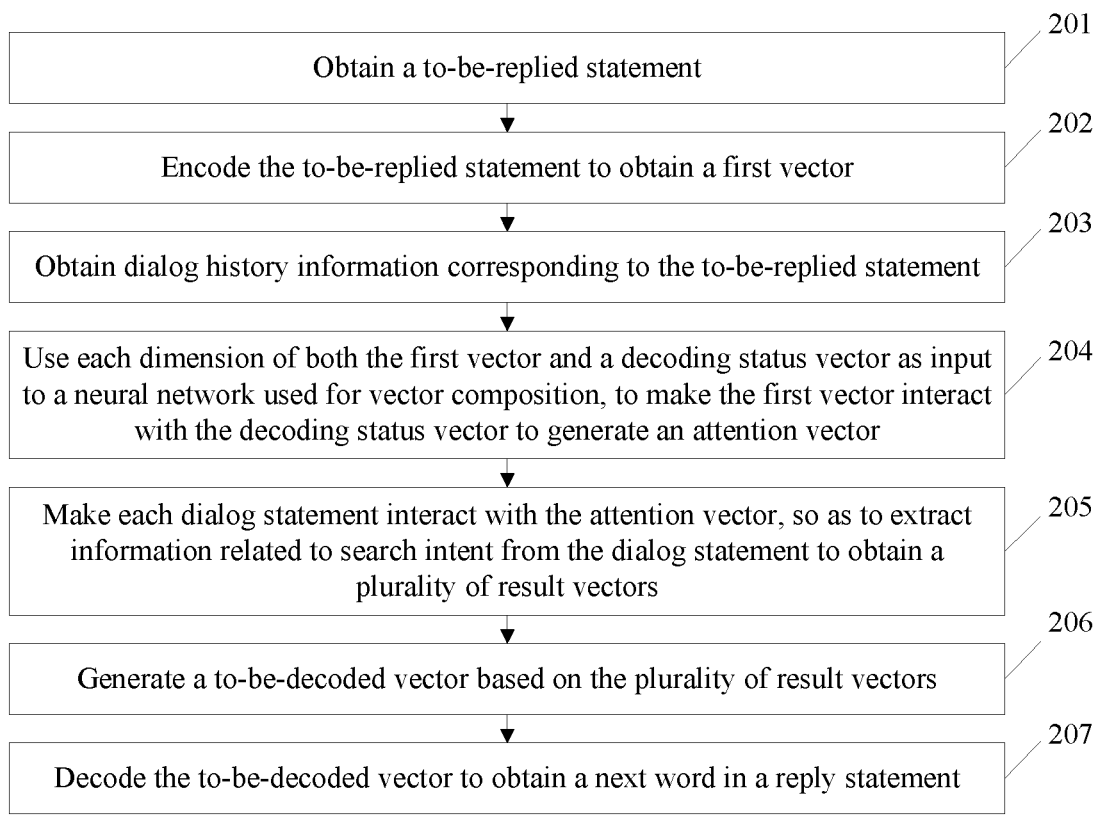
FIG. 4 is a flowchart of another deep learning based dialog method according to an embodiment of the present application.

FIG. 4 is a flowchart of another deep learning based dialog method according to an embodiment of the present application. The method may be implemented by using the dialog device in the foregoing application scenario. Compared with the method provided in FIG. 3, a detailed implementation of each operation is described in this method. Referring to FIG. 4, the method includes the following operations.

Operation 201: Obtain a to-be-replied statement.

The to-be-replied statement is obtained through user input, and the user input includes, but is not limited to, data such as a text, a voice, and a picture.

The obtaining a to-be-replied statement may include: receiving text data (a character, a word, or a sentence), and using the text data as the to-be-replied statement; receiving voice data, performing voice recognition on the voice data to obtain voice-recognized text data, and using the voice-recognized text data as the to-be-replied statement; or receiving picture data, performing optical character recognition on the picture data to obtain recognized text data, and using the recognized text data as the to-be-replied statement.

Operation 202: Encode the to-be-replied statement to obtain a first vector, where the first vector is a representation of the to-be-replied statement.

The first vector may be a single vector.

Operation 202 may include encoding the to-be-replied statement into a single vector. Certainly, a representation form of the encoded to-be-replied statement is not limited thereto in this embodiment of the present application. For example, the representation form may alternatively be a vector sequence. In one embodiment, the to-be-replied statement may be encoded into a vector sequence, and the vector sequence includes at least one vector. When the to-be-replied statement is encoded into a vector sequence, word segmentation processing may be performed first on the to-be-replied statement to obtain at least one word. Then, each word obtained through word segmentation processing is encoded into a vector to constitute the vector sequence.

In this embodiment, the to-be-replied statement is encoded into a single vector, and subsequent processing on the to-be-replied statement becomes processing on the vector. Compared with processing on a vector sequence, this can significantly reduce complexity of subsequent processing. In addition, semantic integrity can be improved by using one vector to represent the to-be-replied statement.

In operation 202, when a vector is used to represent the to-be-replied statement, to be able to express a meaning of the to-be-replied statement, a vector with a relatively large quantity of dimensions is required, for example, 5000 dimensions. When a vector sequence is used to represent the to-be-replied statement, each vector in the vector sequence is used to represent only one word, and therefore each vector may be a vector with a small quantity of dimensions.

In one embodiment, a neural network may be used to encode the to-be-replied statement into a vector. The vector obtained through encoding includes information about various aspects of the to-be-replied statement, for example, intent (which is confirmation, inquiry, or the like) and a specific named entity (such as a place and time).

During encoding of the to-be-replied statement, the to-be-replied statement may be entered to a pre-trained recursive neural network (English: Recursive Neural Network, RNN for short) or a convolutional neural network (English: Convolutional Neural Network, CNN for short) to obtain the first vector.

In one embodiment, encoding the to-be-replied statement by using the RNN may include:
  obtaining, based on the to-be-replied statement, several to-be-encoded words that are sorted sequentially;
  obtaining a feature vector corresponding to each to-be-encoded word; and
  obtaining the first vector through encoding in the following manner: $hi=f(h(i-1), wi)$, where $hi$ is a vector corresponding to an $i^{th}$ to-be-encoded word, $h(i-1)$ is a vector corresponding to an $(i-1)^{th}$ to-be-encoded word, $wi$ is a feature vector corresponding to the $i^{th}$ to-be-encoded word, and the first vector is a vector corresponding to the last to-be-encoded word.

In one embodiment, encoding the to-be-replied statement by using the CNN may include:
  obtaining, based on the to-be-replied statement, several to-be-encoded words that are sorted sequentially;
  obtaining a feature vector corresponding to each to-be-encoded word; and
  performing a pooling convolution operation on the feature vectors corresponding to the several to-be-encoded words, so as to perform feature extraction on the feature vectors corresponding to the several to-be-encoded words, to generate the first vector.

The following describes encoding of the to-be-replied statement by using an example.

Figure 4A:
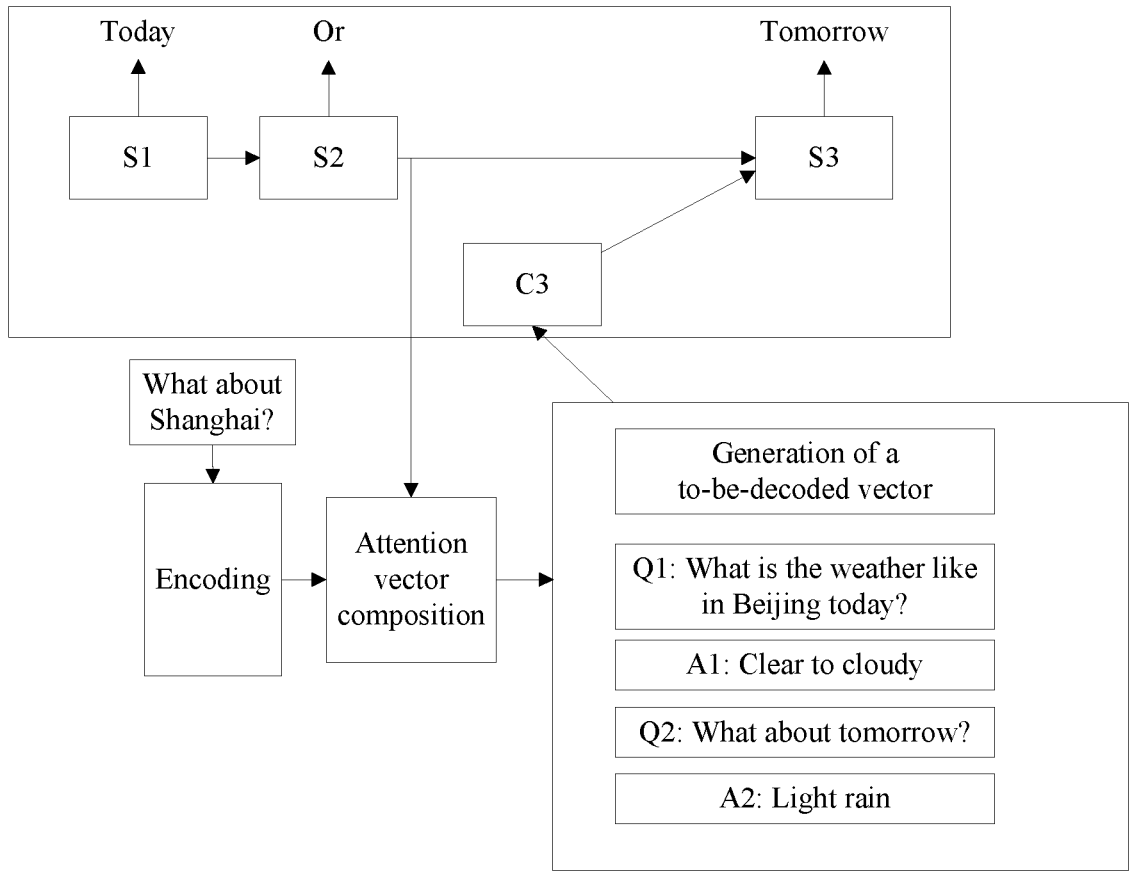
FIG. 4A is a schematic diagram of reply statement generation according to an embodiment of the present application.

As shown in FIG. 4A, a to-be-replied statement "What about Shanghai?" is entered to a neural network to perform statement encoding in operation 202. The neural network used for encoding may be an RNN, especially a special type of RNN including a gating (English: gating) mechanism. The gating mechanism includes, but is not limited to, a gated unit (English: Gated Units, GRU for short) and a short-term memory (English: Long Short-term Memory, LSTM for short). Certainly, the neural network used for encoding herein may alternatively be another neural network, for example, a CNN.

Figure 4B:
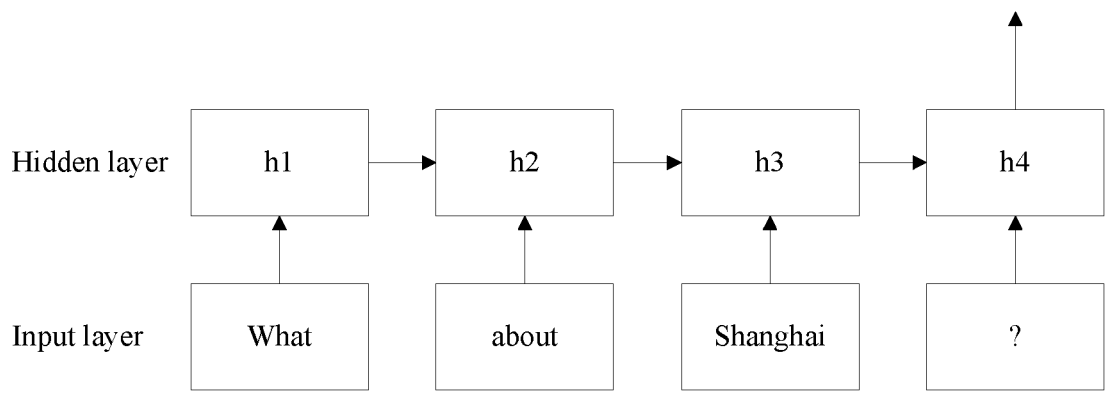
FIG. 4B is a schematic structural diagram of an RNN according to an embodiment of the present application.

As shown in FIG. 4B, FIG. 4B is a schematic diagram of an RNN used for encoding. When being used for encoding a to-be-replied statement, the RNN includes only an input layer and a hidden layer but does not include an output layer. As shown in the figure, user input is "What about Shanghai?". ("What", "about", "Shanghai", and "?" may be considered as four different words (the foregoing to-be-encoded words), and the RNN performs encoding based on an order in which the words appear in the sentence. Hidden layer information of a previous word is fed back to a hidden layer of a current word. When an ending of sign of the sentence (English: Ending Of Sign, EOS for short) appears, encoding of the entire sentence is completed. Hidden layer information of the RNN is output as an encoding result of the sentence.

In one embodiment, a vector corresponding to the word "What" is denoted as h1, and then the RNN combines h1 with a vector corresponding to "about" to generate a new vector h2. Then the vector h2 is combined with a vector corresponding to a next word "Shanghai" to generate a new vector h3. The process proceeds to obtain a vector h4. The vector h4 represents information about the complete sentence "What about Shanghai".

The vectors h(h1-h4) herein also represent a status of an internal node of an encoder.

Figure 4C:
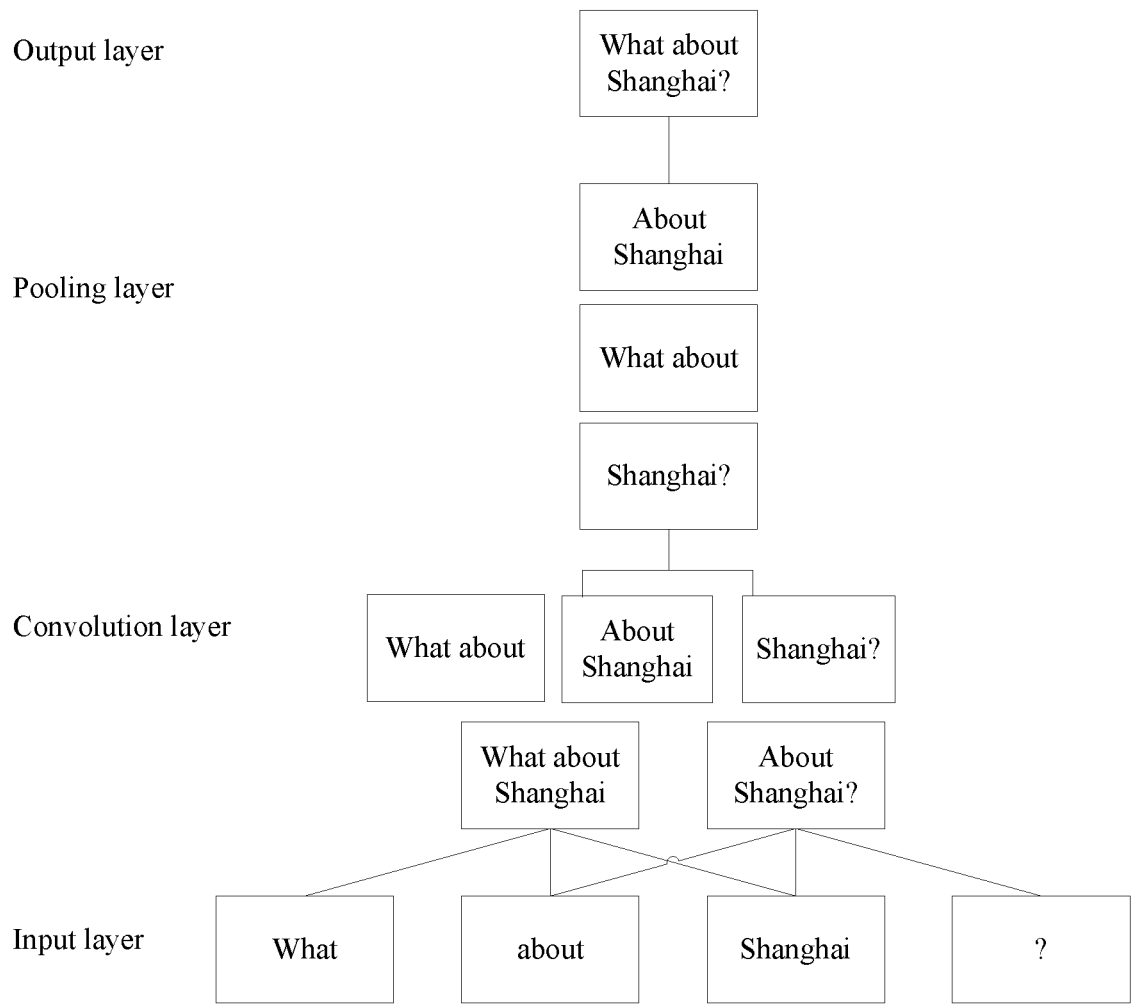
FIG. 4C is a schematic structural diagram of a CNN according to an embodiment of the present application.

As shown in FIG. 4C, FIG. 4C is a schematic diagram of a CNN used for encoding. The CNN includes an input layer, a convolution layer, a pooling layer, and an output layer. A to-be-replied statement entered at the input layer is represented by vectors corresponding to words (that is, the foregoing to-be-encoded words): "What", "about", "Shanghai", and "?" shown in the figure. In this way, original one-dimension text information input is converted into input of a two-dimension structure. For example, there are four words in the figure, a length of a vector corresponding to each word is d, and the input is a two-dimension vector of 4*d. The convolution layer is essentially a feature extraction layer. A parameter may be set to specify a quantity of configured feature filters (English: Filter). For a filter, it may be conceived that a sliding window of a k*d size continuously moves forwards from the first word at the input layer, and k is a window size specified by the filter. For a window at a moment, an input value within this window is converted into a feature value through nonlinear transformation of a neural network. As the window continuously moves forwards, feature values corresponding to the filter are continuously generated to constitute feature vectors of the filter. This is a process of feature extraction by the convolution layer. As shown in the figure, a first filter extracts three words at a time, and performs two extractions: "What about Shanghai" and "about Shanghai?". A second filter extracts two words at a time, and performs three extractions: "What about" "about Shanghai", and "Shanghai?". The pooling layer performs dimension reduction on the feature vectors of the filter, and selects a feature as a final feature. The pooling operation is repeated for a plurality of times to obtain a plurality of vector representations, and these vectors are connected to obtain a semantic representation of the to-be-replied statement, namely, a vector output by the output layer.

Operation 203: Obtain dialog history information corresponding to the to-be-replied statement, where the dialog history information includes at least one round of dialog statements, and each round of dialog statements includes two dialog statements.

In one embodiment, the dialog history information corresponding to the to-be-replied statement is a dialog statement generated within specified time between a dialog system and an object that generates the to-be-replied statement. The dialog history information in this application is not limited thereto. The dialog history information may be a specified quantity of dialog statements, or a dialog statement generated during a connection established between a user to a dialog system.

The obtaining dialog history information corresponding to the to-be-replied statement may include: obtaining, from a local server or a network server, dialog history information corresponding to the to-be-replied statement within specified time.

Operation 204: Use each dimension of both the first vector and a decoding status vector as input to a neural network used for vector composition, to make the first vector interact with the decoding status vector to generate an attention vector, where both the first vector and the decoding status vector include a plurality of dimensions.

In this embodiment of the present application, a decoder may be implemented by using an artificial neural network. In this case, the decoding status vector is a status, after a previous word is generated through decoding, of the neural network used for decoding. For the neural network, the status refers to values of all neurons of the neural network at a moment, that is, a node status of the neural network. It should be noted that, the decoder has not performed vector decoding before the first word is generated. Therefore, in this case, the status of the decoder is an initial status, and the decoding status vector is an initial value, for example, an all-zero vector.

The attention vector includes information, extracted from the to-be-replied statement, used for generating a reply statement, and the information is related to generation of a next word.

The making the first vector interact with the decoding status vector may include:
  entering the first vector and the decoding status vector to a pre-trained deep neural network (English: Deep Neural Network, DNN for short) to obtain the attention vector.

In one embodiment, the entering the first vector and the decoding status vector to a pre-trained deep neural network to obtain the attention vector includes:
  using each dimension of both the first vector and the decoding status vector as input to the deep neural network.

Figure 4D:
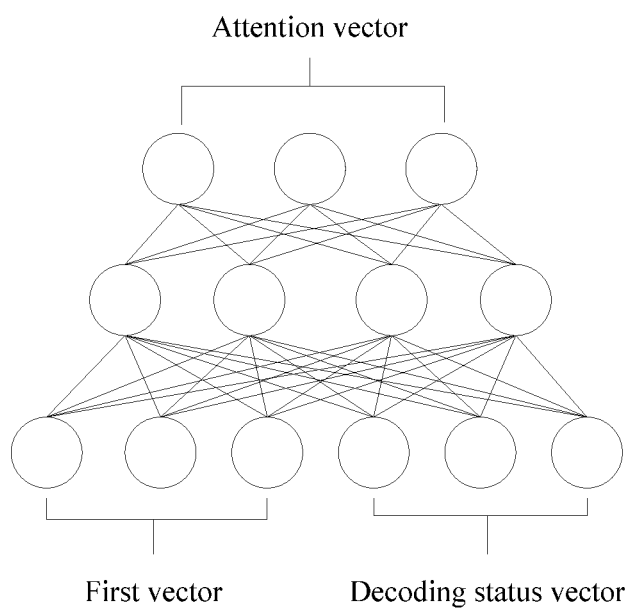
FIG. 4D is a schematic diagram of attention vector composition according to an embodiment of the present application.

As shown in FIG. 4A, based on the vector representation of the to-be-replied statement and the status vector of the neural network used for decoding, the attention vector is composed by using the neural network. The neural network may be implemented by using a DNN, as shown in FIG. 4D. In FIG. 4D, one dimension of a vector is entered to each node of an input layer of a neural network. Quantities of dimensions of a vector and a decoding status vector in FIG. 4D are merely examples, and no limitation is set thereto in this embodiment of the present application. The output attention vector should include search intent. In the example in FIG. 4A, the search intent may include figuring out a basic underlying meaning of "What about Shanghai?", for example, what kind of information about Shanghai.

Operation 205: Make each dialog statement interact with the attention vector, so as to extract information related to search intent from the dialog statement to obtain a plurality of result vectors.

As shown in FIG. 4A, retrieval is performed in the dialog history information by using the attention vector. There are many implementations of a neural network used for retrieval, for example, a CNN++. A to-be-decoded vector output by the CNN++ includes information that is needed to generate a next word. As shown in FIG. 4A, in a process of generating the to-be-decoded vector, the CNN++ learns that content about weather is mentioned by a user in the dialog history information, and that time associated with the weather is mentioned when the weather is mentioned, for example, "today" and "tomorrow". Therefore, when generating a reply based on the to-be-decoded vector, the neural network used for decoding may ask the user in reply time of the weather in Shanghai that the user wants to know.

In one embodiment, operation 205 may include:
encoding each dialog statement in the dialog history information to obtain a second vector corresponding to the dialog statement, where the second vector is a representation of the corresponding dialog statement; and
making each second vector interact with the attention vector, so as to extract the information related to the search intent from the dialog statement to obtain the plurality of result vectors.

An encoding manner of the dialog statement may be the same as an encoding manner of the to-be-replied statement. The attention vector and the second vector are entered together as input to a plurality of neural networks (RNNs or CNNs) to generate the plurality of result vectors.

In another embodiment, operation 205 may include:
encoding each dialog statement in the dialog history information, and entering the attention vector together with the dialog statement into an encoder during an encoding process, so as to extract the information related to the search intent from the dialog statement to obtain the plurality of result vectors.

Figure 4E:
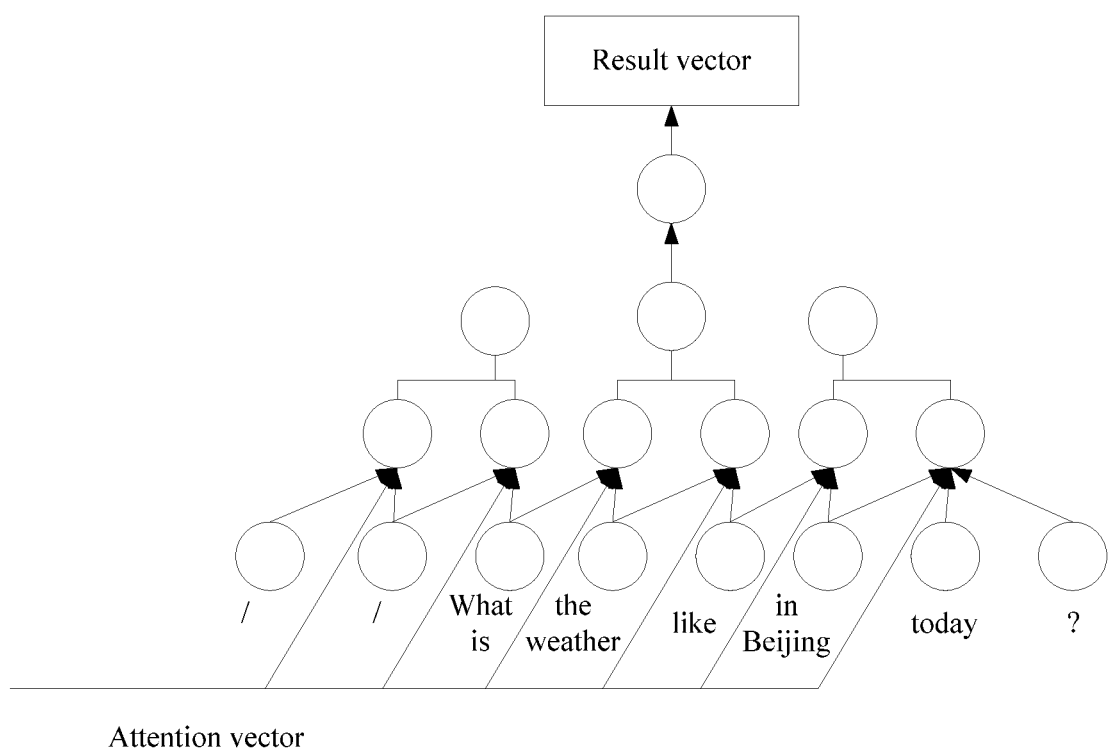
FIG. 4E is a schematic diagram of result vector generation according to an embodiment of the present application.

In one embodiment, as shown in FIG. 4E, the foregoing attention vector is entered during encoding of the dialog statement, so as to generate the result vector, and the result vector is entered to the CNN.

Operation 206: Generate a to-be-decoded vector based on the plurality of result vectors.

Functions of operation 205 and operation 206 are to retrieve, by using the attention vector, feature information, in the dialog history information, related to the to-be-replied statement.

Figure 4F:
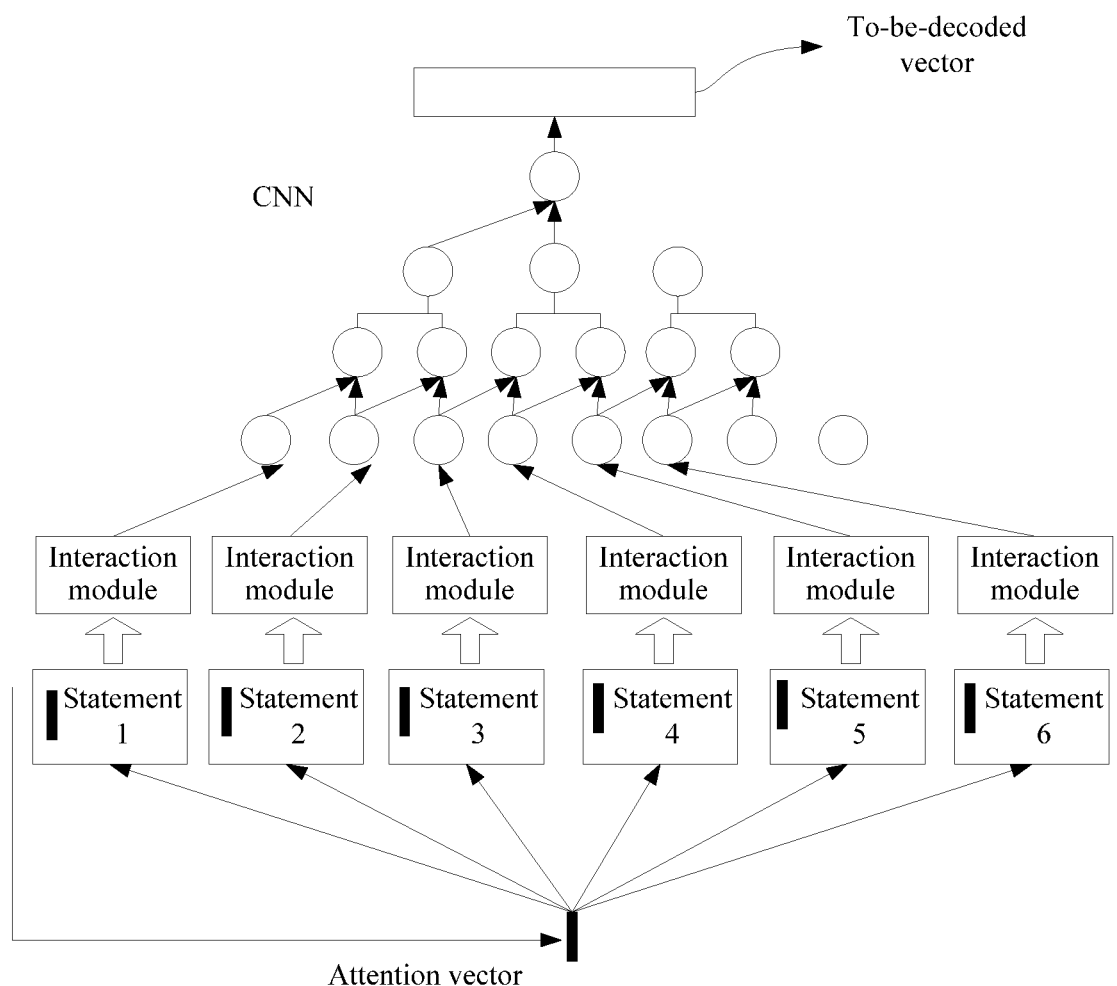
FIG. 4F is a schematic diagram of generation of a to-be-decoded vector according to an embodiment of the present application.

As shown in FIG. 4F, an attention vector is made to interact with a dialog statement by using an interaction module to generate a result vector. The result vector includes both original information about the attention vector and information about a sentence in dialog history information. A plurality of result vectors output by a plurality of interaction modules are output as a to-be-decoded vector by a CNN, so as to extract information about the plurality of result vectors and compress the information into a to-be-decoded vector.

Operation 207: Decode the to-be-decoded vector to obtain a next word in a reply statement.

Operation 207 may include decoding the to-be-decoded vector to obtain a word in the reply statement; and forming the reply statement by using words obtained through a plurality of times of decoding.

The decoding the to-be-decoded vector to generate a word includes:
entering the to-be-decoded vector to a pre-trained RNN or CNN (decoder), and decoding the to-be-decoded vector to generate the word.

A neural network is used to decode the to-be-decoded vector to generate the word. The neural network is used to generate the reply statement word by word, and is usually implemented by using an RNN (for example, a GRU and an LSTM), or is implemented based on a decoding model of another neural network (such as a CNN). As shown in FIG. 4A, after a word "or" is generated, the status vector of the neural network used for decoding is used to compose the attention vector, the attention vector is invoked by the neural network used for retrieval to access an externally disposed storage, and the output to-be-decoded vector is used to generate a next word "tomorrow". The operation is repeated until an EOS is generated.

Further, the method may further include storing the reply statement in the dialog history information.

In this embodiment of the present application, a basic human-machine dialog procedure between the user and the dialog system (English: Dialog System, DS for short) is: for each speech (a to-be-replied statement) of the user, the system provides a reply statement by considering previous dialog history information. A process of generating a reply by the system is described in operation 201 to operation 207. Then, the user may provide a further speech. An example is used for description below.

Figure 4G:
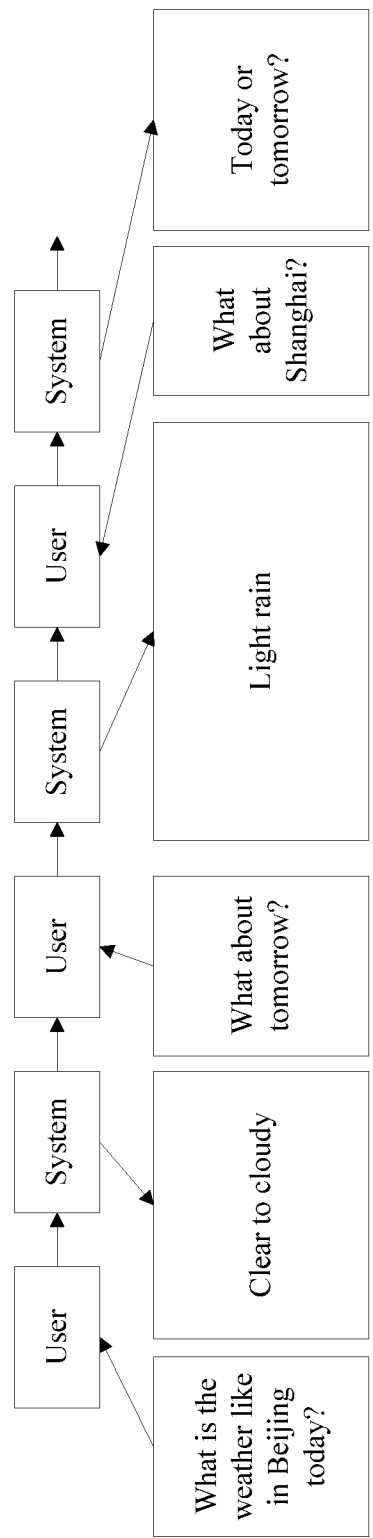
FIG. 4G is a basic schematic flowchart of human-machine dialog according to an embodiment of the present application.

For example, as shown in FIG. 4G:
User: What is the weather like in Beijing today?
DS: Clear to cloudy.
User: What about tomorrow?
DS: Light rain.
User: What about Shanghai?
DS: Today or tomorrow?

In the foregoing dialog, in a process of generating the reply "Today or tomorrow?" by the dialog system, it is assumed that the system has just sequentially generated the two words "today" and "or", and during generation of a next word, in the dialog system, the status vector of the neural network used for decoding (after the word "or" is generated) and the vector, corresponding to the to-be-replied statement ("What about Shanghai?"), generated on the neural network used for encoding are entered together to the neural network used for attention vector composition. The to-be-decoded vector that can represent the status vector of the neural network used for decoding, the vector corresponding to the to-be-replied statement, and the information about the vector of the sentences in the dialog history information is generated by using the generated attention vector and the neural network used for retrieval (such as a CNN++). The to-be-decoded vector is then decoded to generate the reply statement. The to-be-decoded vector composed in the foregoing process by the neural network used for retrieval actually includes the following meaning: The information such as "What is the weather like in Beijing today" and "Tomorrow" mentioned by the user means: "What about Shanghai?" that the user asks should be associated with weather. Comprehensive processing is performed on the two pieces of information and the attention vector to further determine the weather in Shanghai on which day the user wants to know: today or tomorrow.

Figure 4H:
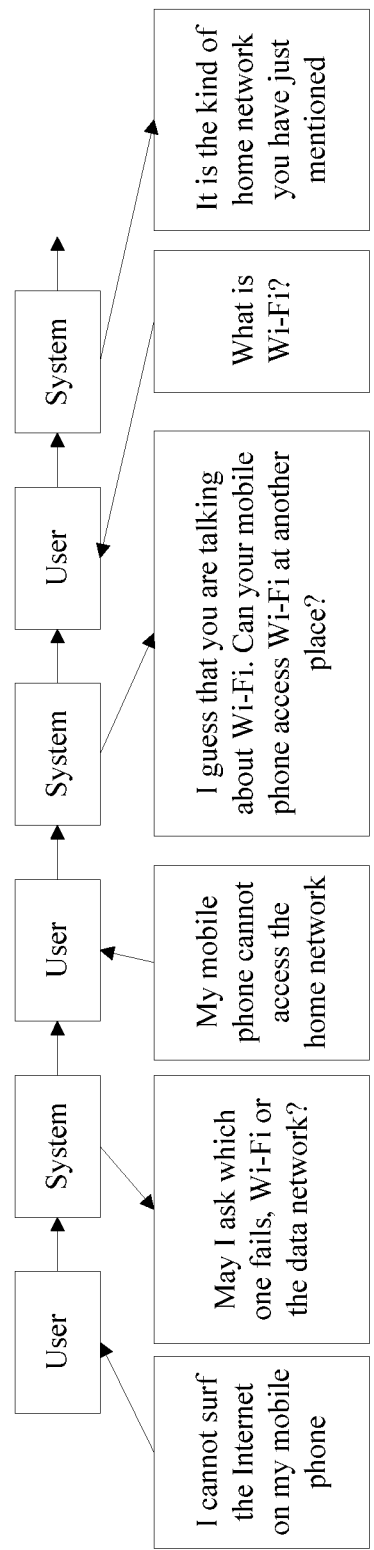
FIG. 4H is a basic schematic flowchart of human-machine dialog according to an embodiment of the present application.

For another example, as shown in FIG. 4H:
User: I cannot surf the Internet on my mobile phone.
DS: May I ask which one fails, Wi-Fi or the data network?
User: My mobile phone cannot access the home network.
DS: I guess that you are talking about Wi-Fi. Can your mobile phone access Wi-Fi at another place?
User: What is Wi-Fi?
DS: It is the kind of home network you have just mentioned.

In the foregoing dialog, in a process of generating the reply "It is the kind of home network you have just mentioned" by the dialog system, it is assumed that the system has just sequentially generated the following six words "It is", "the kind of", "home", "network", "you", and "have just", and during generation of a next word, in the dialog system, the status vector of the neural network used for decoding (after the word "have just" is generated) and the vector, corresponding to the to-be-replied statement ("What is Wi-Fi?"), generated on the neural network used for encoding are entered together to the neural network used for attention vector composition. The to-be-decoded vector that can represent the status vector of the neural network used for decoding, the vector corresponding to the to-be-replied statement, and the information about the vector of the sentences in the dialog history information is generated by using the generated attention vector and the neural network used for retrieval (such as a CNN++). The to-be-decoded vector is then decoded to generate the reply statement. The to-be-decoded vector composed in the foregoing process by the neural network used for retrieval actually includes the following meaning: The information about "My mobile phone cannot access the home network" mentioned by the user follows the question of the system "May I ask which one fails, Wi-Fi or the data network", and this means that there may be a correspondence between the information and the question. After comprehensive processing is performed on the information and the question and the attention vector, the phrase "home network" is proposed as an explanation for the question "What is Wi-Fi?".

Further, the method provided in this embodiment of the present application further includes training a model of the dialog system, where the model of the dialog system includes a plurality of neural networks used for encoding (operation 202), composition (operation 204), extraction (operation 205 and operation 206), and decoding (operation 207), respectively.

In one embodiment, the training a model of the dialog system includes:
training four neural networks used for encoding, attention vector composition, retrieval, and decoding, respectively; and after the four neural networks are trained, training the four neural networks as a system, so as to improve accuracy of the model.

Each neural network may be trained in an end-to-end (English: end-to-end) manner (such as a back-propagation algorithm (English: Back-Propagation, BP for short)), or a layer-by-layer training manner.

More specifically, training the neural network in an end-to-end manner includes: randomly setting an initial value of the neural network, using a training sample as input to the neural network, performing forward propagation layer by layer from the first hidden layer to the last hidden layer to obtain an output value of the neural network, calculating an error between the output value and a label, and performing back-propagation layer by layer from the last hidden layer to the first hidden layer by using a BP algorithm, to adjust a parameter of each hidden layer.

In another embodiment, four neural networks may be used as a system to be directly trained in a joint training manner. This reduces training time and improves training efficiency.

A training sample may be obtained from a large amount of user dialog data, such as a microblog dialog, a customer service question and answer on an e-commerce website, and a forum page In this embodiment of the present application, after the to-be-replied statement is encoded into the vector, retrieval is performed on the dialog history information by using the attention vector composed by using the vector and the decoding status vector, so that the entered decoded vector includes content of the dialog history information. In this way, the deep learning based dialog system can effectively process and utilize the dialog history information, so that the output reply statement can meet a user requirement and dialog quality is improved. In addition, the foregoing deep learning based dialog method is completely based on a neural-network generative model that is different from a dialog model using a template (rule) or a retrieval-based dialog model. Advantages thereof are that generated language is close to natural human language and that flexibility and context-related performance required during dialog is achieved.

In addition, in the process of retrieving the dialog history information, each statement in the dialog history information is encoded into a vector, and the vector is made to interact with the vector corresponding to the to-be-replied statement. This avoids a problem that main content of the dialog history information is lost because of excessive compression of the dialog history information and can implement storage of the information in the dialog history information. For example, this avoids a problem that meaning loss and aliasing and a difficulty in differentiating Beijing and Shanghai are caused by compressing the information having an entity sense such as "Beijing" and "Shanghai" into a same vector.

Figure 5:
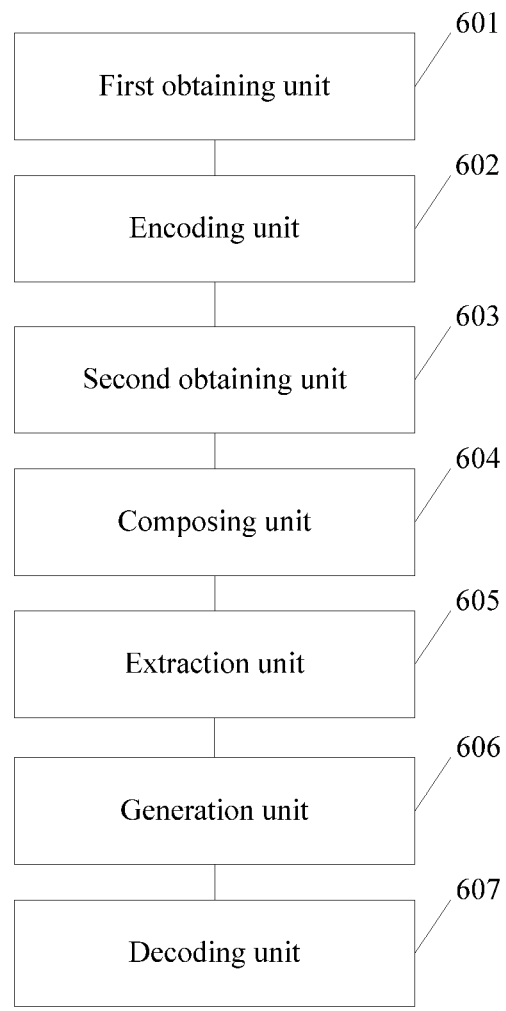
FIG. 5 is a block diagram of a deep learning based dialog apparatus according to an embodiment of the present application.

FIG. 5 is a block diagram of a deep learning based dialog apparatus according to an embodiment of the present application. The deep learning based dialog apparatus is configured to implement the deep learning based dialog method provided in FIG. 3 or FIG. 4. The deep learning based dialog apparatus may be implemented by using software, hardware, or a combination thereof, to serve as an entirety or a part of the dialog device provided in FIG. 2. The deep learning based dialog apparatus may include a first obtaining unit 601, an encoding unit 602, a second obtaining unit 603, a composing unit 604, an extraction unit 605, a generation unit 606, and a decoding unit 607.

The first obtaining unit 601 is configured to obtain a to-be-replied statement.

The encoding unit 602 is configured to encode the to-be-replied statement to obtain a first vector, where the first vector is a representation of the to-be-replied statement.

The second obtaining unit 603 is configured to obtain dialog history information corresponding to the to-be-replied statement, where the dialog history information includes at least one round of dialog statements, and each round of dialog statements includes two dialog statements.

The composing unit 604 is configured to compose an attention vector by using the first vector and a decoding status vector, where the decoding status vector is used to indicate a status of a decoder when a current word in a reply statement is output, and the attention vector is used to represent search intent.

The extraction unit 605 is configured to make each dialog statement interact with the attention vector, so as to extract information related to the search intent from the dialog statement to obtain a plurality of result vectors.

The generation unit 606 is configured to generate a to-be-decoded vector based on the plurality of result vectors.

The decoding unit 607 is configured to decode the to-be-decoded vector to obtain a next word in the reply statement.

In this embodiment of the present application, after the to-be-replied statement is encoded into the first vector, the attention vector representing the search intent is composed by using the first vector and the decoding status vector, information in the dialog history information is extracted by using the attention vector, then the to-be-decoded vector is generated, and the to-be-decoded vector is decoded to generate the word in the reply statement. According to this dialog manner, the generated reply statement is not only generated based on the to-be-replied statement, but also refers to content in the dialog history information corresponding to the to-be-replied statement, and the dialog history information can be effectively processed and utilized. In this way, the output reply statement can meet a user requirement and dialog quality is improved.

In one embodiment, the composing unit 604 is configured to:
use each dimension of both the first vector and the decoding status vector as input to a neural network used for vector composition, to make the first vector interact with the decoding status vector to generate the attention vector, where both the first vector and the decoding status vector include a plurality of dimensions.

In one embodiment, the extraction unit 605 is configured to:
encode each dialog statement in the dialog history information to obtain a second vector corresponding to the dialog statement, where the second vector is a representation of the corresponding dialog statement; and
make each second vector interact with the attention vector, so as to extract the information related to the search intent from the dialog statement to obtain the plurality of result vectors.

In one embodiment, the extraction unit 605 is configured to:
encode each dialog statement in the dialog history information, and enter the attention vector together with the dialog statement into an encoder during an encoding process, so as to extract the information related to the search intent from the dialog statement to obtain the plurality of result vectors.

In one embodiment, the generation unit 606 is configured to:
separately use the plurality of result vectors as input to a neural network used for feature extraction, so as to extract features of the plurality of result vectors to generate the to-be-decoded vector.

It should be noted that, in a case of performing human-machine dialog by the deep learning based dialog apparatus provided in the foregoing embodiment, division of the foregoing functional modules is only used as an example for description. In actual application, the foregoing functions may be allocated to different functional modules depending on a requirement, in other words, an internal structure of the device is divided into different functional modules, to complete all or some of the functions described above. In addition, an idea of the deep learning based dialog apparatus provided in the foregoing embodiment is the same as that of the deep learning based dialog method embodiment, and for a specific implementation process thereof, refer to the method embodiment. Details are not repeated herein.

A person of ordinary skill in the art may understand that all or some of the operations of the embodiments may be implemented by hardware or a program instructing related hardware. The program may be stored in a computer-readable storage medium. The storage medium may include a read-only memory, a magnetic disk, an optical disc, or the like.

The foregoing description is merely an optional embodiment of this application, but is not intended to limit this application. Any modification, equivalent replacement, or improvement made without departing from the spirit and principle of this application should fall within the protection scope of this application.

What is claimed is:

1. A deep learning based dialog method comprising:
obtaining a query statement;
encoding the query statement to obtain a first vector, wherein the first vector is a representation of the query statement;
obtaining dialog history information corresponding to the query statement, wherein the dialog history information comprises at least one round of dialog statements including the query statement and a reply statement generated within a specified time and a place;
composing an attention vector by using the first vector and a decoding status vector, wherein the decoding status vector is used to indicate a status of a decoder when a current word in the reply statement is output, and the attention vector is used to represent search intent including the specified time and the place in the dialog history information;
making each dialog statement interact with the attention vector, so as to extract information related to the search intent from the dialog statement to obtain a plurality of result vectors;
generating a to-be-decoded vector based on the plurality of result vectors; and
decoding the to-be-decoded vector to obtain a next word in the reply statement.

2. The method according to claim 1, wherein the composing the attention vector by using the first vector and the decoding status vector comprises:
using each dimension of both the first vector and the decoding status vector as input to a neural network used for vector composition, to make the first vector interact with the decoding status vector to generate the attention vector, wherein both the first vector and the decoding status vector comprise a plurality of dimensions.

3. The method according to claim 1, wherein the making each dialog statement interact with the attention vector, so as to extract information related to the search intent from the dialog statement to obtain the plurality of result vectors comprises:
encoding each dialog statement in the dialog history information to obtain a second vector corresponding to the dialog statement, wherein the second vector is a representation of the corresponding dialog statement; and
making each second vector interact with the attention vector, so as to extract the information related to the search intent from the dialog statement to obtain the plurality of result vectors.

4. The method according to claim 1, wherein the making each dialog statement interact with the attention vector, so as to extract information related to the search intent from the dialog statement to obtain the plurality of result vectors comprises:
encoding each dialog statement in the dialog history information, and entering the attention vector together with the dialog statement into an encoder during an encoding process, so as to extract the information related to the search intent from the dialog statement to obtain the plurality of result vectors.

5. The method according to claim 1, wherein the generating the to-be-decoded vector based on the plurality of result vectors comprises:
separately using the plurality of result vectors as input to a neural network used for feature extraction, so as to extract features of the plurality of result vectors to generate the to-be-decoded vector.

6. A non-transitory machine-readable storage medium having instructions stored therein, which when executed by a processor, cause the processor to perform operations, the operations comprising:
obtaining a query statement;
encoding the query statement to obtain a first vector, wherein the first vector is a representation of the query statement;
obtaining dialog history information corresponding to the query statement, wherein the dialog history information comprises at least one round of dialog statements including the query statement and a reply statement generated within a specified time and a place;
composing an attention vector by using the first vector and a decoding status vector, wherein the decoding status vector is used to indicate a status of a decoder when a current word in the reply statement is output, and the attention vector is used to represent search intent including the specified time and the place in the dialog history information;
making each dialog statement interact with the attention vector, so as to extract information related to the search intent from the dialog statement to obtain a plurality of result vectors;
generating a to-be-decoded vector based on the plurality of result vectors; and
decoding the to-be-decoded vector to obtain a next word in the reply statement.

7. The non-transitory machine-readable storage medium according to claim 6, wherein the operations further comprise:
using each dimension of both the first vector and the decoding status vector as input to a neural network used for vector composition, to make the first vector interact with the decoding status vector to generate the attention vector, wherein both the first vector and the decoding status vector comprise a plurality of dimensions.

8. The non-transitory machine-readable storage medium according to claim 6, wherein the operations further comprise:
encoding each dialog statement in the dialog history information to obtain a second vector corresponding to the dialog statement, wherein the second vector is a representation of the corresponding dialog statement; and
making each second vector interact with the attention vector, so as to extract the information related to the search intent from the dialog statement to obtain the plurality of result vectors.

9. The non-transitory machine-readable storage medium according to claim 6, wherein the operations further comprise:
encoding each dialog statement in the dialog history information, and enter the attention vector together with the dialog statement into an encoder during an encoding process, so as to extract the information related to the search intent from the dialog statement to obtain the plurality of result vectors.

10. The non-transitory machine-readable storage medium according to claim 6, wherein the operations further comprise:
separately using the plurality of result vectors as input to a neural network used for feature extraction, so as to extract features of the plurality of result vectors to generate the to-be-decoded vector.

11. A deep learning based dialog device comprising: a processor, a memory, and a communications interface, the memory configured to store a software program and a module, and the processor implements the following operations by executing the software program and/or the module stored in the memory:
obtaining a query statement;
encoding the query statement to obtain a first vector, wherein the first vector is a representation of the query statement;
obtaining dialog history information corresponding to the query statement, wherein the dialog history information comprises at least one round of dialog statements including the query statement and a reply statement generated within a specified time and a place;
composing an attention vector by using the first vector and a decoding status vector, wherein the decoding status vector is used to indicate a status of a decoder when a current word in the reply statement is output, and the attention vector is used to represent search intent including the specified time and the place in the dialog history information;
making each dialog statement interact with the attention vector, so as to extract information related to the search intent from the dialog statement to obtain a plurality of result vectors;
generating a to-be-decoded vector based on the plurality of result vectors; and
decoding the to-be-decoded vector to obtain a next word in the reply statement.

12. The deep learning based dialog device according to claim 11, wherein the composing the attention vector by using the first vector and the decoding status vector comprises:
using each dimension of both the first vector and the decoding status vector as input to a neural network used for vector composition, to make the first vector interact with the decoding status vector to generate the attention vector, wherein both the first vector and the decoding status vector comprise a plurality of dimensions.

13. The deep learning based dialog device according to claim 11, wherein the making each dialog statement interact with the attention vector, so as to extract information related to the search intent from the dialog statement to obtain the plurality of result vectors comprises:
encoding each dialog statement in the dialog history information to obtain a second vector corresponding to the dialog statement, wherein the second vector is a representation of the corresponding dialog statement; and making each second vector interact with the attention vector, so as to extract the information related to the search intent from the dialog statement to obtain the plurality of result vectors.

14. The deep learning based dialog device according to claim 11, wherein the making each dialog statement interact with the attention vector, so as to extract information related to the search intent from the dialog statement to obtain the plurality of result vectors comprises:
   encoding each dialog statement in the dialog history information, and entering the attention vector together with the dialog statement into an encoder during an encoding process, so as to extract the information related to the search intent from the dialog statement to obtain the plurality of result vectors.

15. The deep learning based dialog device according to claim 11, wherein the generating the to-be-decoded vector based on the plurality of result vectors comprises:
   separately using the plurality of result vectors as input to a neural network used for feature extraction, so as to extract features of the plurality of result vectors to generate the to-be-decoded vector.

\* \* \* \* \*